(12) United States Patent
Giandomenico et al.

(10) Patent No.: US 8,093,527 B2
(45) Date of Patent: Jan. 10, 2012

(54) DEVICE AND METHOD FOR HIGH FREQUENCY ELECTRICAL DISCHARGE MACHINING

(75) Inventors: Nicola Giandomenico, Troinex (CH); Franck Besson, Fillinges (FR); Thierry Poncet, Péron (FR); Fabrice Jaques, Meyrin (CH); Friedhelm Altpeter, Susten (CH)

(73) Assignee: Charmilles Technologies SA, Meyrin (CH)

( * ) Notice: Subject to any disclaimer, the term of this patent is extended or adjusted under 35 U.S.C. 154(b) by 1158 days.

(21) Appl. No.: 11/891,022

(22) Filed: Aug. 8, 2007

(65) Prior Publication Data

US 2008/0047937 A1   Feb. 28, 2008

(30) Foreign Application Priority Data

Aug. 11, 2006   (EP) .................................... 06016866

(51) Int. Cl.
  *B23H 1/02* (2006.01)
  *B23H 7/14* (2006.01)
(52) U.S. Cl. ................ 219/69.17; 219/69.12; 219/69.13
(58) Field of Classification Search ............... 219/69.12, 219/69.13, 69.18, 69.17, 69.2
See application file for complete search history.

(56) References Cited

U.S. PATENT DOCUMENTS

| | | | |
|---|---|---|---|
| 4,104,502 A * | 8/1978 | Ullmann et al. | 219/69.12 |
| 4,447,696 A | 5/1984 | Niwa | |
| 4,798,929 A | 1/1989 | Itoh | |
| 5,233,147 A * | 8/1993 | Magara | 219/69.12 |
| 5,824,986 A * | 10/1998 | Derighetti et al. | 219/69.12 |
| 6,252,191 B1 * | 6/2001 | D'Amario | 219/69.12 |
| 6,320,151 B1 * | 11/2001 | Angelella et al. | 219/69.12 |
| 6,930,273 B2 | 8/2005 | Nakashima et al. | |
| 2003/0132200 A1 * | 7/2003 | Nakashima et al. | 219/69.12 |

FOREIGN PATENT DOCUMENTS

| | | |
|---|---|---|
| EP | 1097773 | 5/2001 |
| JP | 11-151620 A * | 6/1999 |

* cited by examiner

*Primary Examiner* — Geoffrey S Evans
(74) *Attorney, Agent, or Firm* — Harness, Dickey & Pierce, P.L.C.

(57) ABSTRACT

The invention relates to a device and a method for electrical discharge machining of a work piece by means of a working electrode. A sequence of working pulses is applied on the work gap between the working electrode and the work piece. The working pulses comprise eroding pulses for eroding material off the work piece and measuring pulses during which an ignition voltage is applied on the work gap in order to initiate a discharge within the work gap and to measure the corresponding, ignition delay time. The ignition voltage and/or the gap width are adjusted such that the ignition delay time is smaller than an oscillation time of the working electrode oscillating within the work gap due to the electrostatic attraction force and the mechanical restoring force.

31 Claims, 10 Drawing Sheets

DEVICE AND METHOD FOR HIGH FREQUENCY ELECTRICAL DISCHARGE MACHINING

FIELD OF THE INVENTION

The present invention relates to a method and apparatus for machining a work piece by electrical discharge, in particular to provide finished surfaces using a high-frequency voltage.

It is well known in the field of wire electrical machining that a fine-machined surface of roughness lower than 0.1 micrometer (Ra) can be obtained by generating high frequency discharges of short duration and limited intensity between electrode and work piece. High-frequency voltages in the range of 0.5 to 2 MHz are commonly used in wire electrical machining for performing semi-mirror-finish operations.

With recent improvements in process control, it is now possible to achieve high shape trueness on the work piece. During the final cut with wire electrodes, we can consider shape tolerances, corner errors and vertical profiles in the range of 1 micron.

It is known that the most significant forces, i.e. the electrostatic and electromagnetic attraction forces, the plasma pressure repulsive force and the mechanical restoring force cooperate to set the wire electrode into a neutral rest position. Being sometimes attractive, sometimes repulsive depending on the excursion direction, the resulting force restores the electrode into its neutral rest position, achieving a natural equilibrium. In the majority of applications up to now, this last auto regulation effect, providing a stable equilibrium, enabled to engineer the simplest path feed rate controls as open loop systems.

Some of the key issues for machining finished surfaces are:
(i) axis control in order to achieve constant machining conditions, (ii) appropriate measurement of the deviations from these machining conditions, (iii) reduction of the measuring discharge energy in order to keep a perfect surface finish.
(i) Now that the direct cuts and the first finishing modes are well controlled, the trend is directed towards an even finer (semi mirror) surface roughness, known as super finishing modes, where the electrode works laterally overlapping material to erode off a few microns. Due to the extremely weak energies of the discharges, shape trueness is no more to be corrected. That requires an improved axis servo control to allow removing material only where it is necessary and achieving a sizeable travelling speed in spite of a reduced removal rate per discharge.
Besides super finishing modes where the wire electrode works laterally, one other major trend is to machine sub-millimeter work pieces using small wires of diameters smaller than 50 micron and as small as 15 micron. Similarly, due to the fragility of such wires, high frequency machining voltages with reduced discharge energies are required. In these last applications the wire electrode achieves direct cuts and must control a frontal gap.
In both situations, the above-mentioned stability mode only exists in a very narrow region of gap width. Moving the wire at constant speed becomes ineffective, so that a very reactive servo control has to be developed. Unfortunately, as stated below, the necessary input signal is currently unavailable or at least its measurement remains cumbersome. A true image of the actual gap is missing and feedback control is then impossible.
(ii) When applying a constant voltage at the boundaries of a work gap, the ignition delay TD is unanimously recognized as being the most reliable signal correlated to the real gap width. We experimentally know that the measurement of the ignition delay TD suffers less from the imperfections or tolerances of any system and that it is easier to measure precisely a time rather than a voltage. In the scope of standard industrial manufacturing, the ignition delay allows better repeatability from one device to the next one.
Measuring an ignition delay within high frequency discharges would require expensive electronic devices, featuring the most embarrassing complication in related topics. A cheap electronic treatment implies a reasonably long ignition period, typically larger than 1 microsecond.
Furthermore, in such operating conditions, measuring an ignition delay would yield hazardous results because ignition within high frequency discharges is due essentially to the voltage slope dV/dt and the correlation between ignition delay and actual gap width is badly known.
Introducing a relatively long ignition delay period, as mentioned, to give some reliability to the gap sensor, leads to slow the machining rate and to unbalance wire equilibrium with the risk to make streaks, scratches or marks on the work piece surface and this even if the waste of time is to be neglected.
Assuming the ignition delay as unusable, there is left the choice of using the average machining voltage as an input signal to the speed servo control. But unfortunately similar conclusions must be drawn: the noise level with high frequency discharges is so high that it becomes more difficult to correctly distinguish between the cases "idle machining", "in machining" and "shortcircuit". When considering industrial manufacturing, the scattering between the average machining voltage from one machine to another makes it less economic to tune each individual machine during its final production stage.
(iii) At last, the generator of erosion delivers a too high energy per discharge, incompatible with the refined surface roughness required, and, furthermore, the stray capacity located at the boundaries of the work gap adds a difficulty to minimizing the energy of the discharge.

DESCRIPTION OF THE PRIOR ART

U.S. Pat. No. 4,447,696 deals with a process of discharge shaping a work piece by applying an intermittent high frequency voltage and an intermittent DC voltage so that one is applied during the quiescent time of the other. The combination of an intermittent DC voltage of about 20 volts with high frequency bursts may be intended to significantly decrease the consumption rate of a sinking electrode. An automatic electrode feed system is described to maintain a constant work gap by advancing the electrode depending upon the progress of the operation. The high frequency signal is filtered to its average value and compared with a reference value to get the input for the gap regulation. It must be assumed in principle that the peak value of the voltage applied across the work gap and accumulated on a capacitor is proportional to the width of the work gap. But the shortcomings of this method are a waste of information due to the filtering thus slowing down the loop reaction; when applied to wire electrodes, difficulties occur to sort between short circuit and idle state; lack of accuracy brings difficulties in reproducibility and machine identity.

U.S. Pat. No. 4,798,929 teaches how to measure the electrical resistance, to detect the degree of electric insulation, or dielectric strength of the spark gap by means of an additional AC current source. Where sludge and ions are present, the degree of insulation due to the sludge only can be independently detected since the mobility or the ions is insensitive to the high frequency. Thus, the gap conditions are determined by rough machining rather than measuring the precise gap width. Preventing wire breakages caused by a concentration of sludge is not a concern in the finishing stages of machining. Devices derived therefrom are not tailored to efficiently machine by means of a high-frequency AC voltage but to exclusively fulfil measurements out of it.

U.S. Pat. No. 6,320,151 aims to achieve a high shape trueness on the work piece while machining with a wire electrode and high frequency voltages. Inaccuracies of the work piece are corrected during the finishing cuts, i.e. curvature or hollow forms left by the preceding cuts are erased, which tend to be accentuated if several finishing cuts are made. The corrections are performed by means of measurement periods cyclically following machining periods, so that the wire is released from the antagonistic forces of the preceding machining period and will find, if it is curved, a rectilinear form after some oscillations.

The control of the advance of the wire is based on two process values: the average ignition delay, or average machining voltage, and the error compared to the aforementioned values. If the arrow of the wire curvature is smaller than the gap, the measurement of the ignition delay permits to know quite simultaneously the arrow and the gap, respectively correlated with the two preceding process values.

During the measurement periods a series of eroding impulses are needed to be able to compare the respective ignition delays of each impulse. The first one may be characteristic of the gap if not too much delayed from the preceding machining period. By comparing it with the following ones, it becomes possible to deduce if the wire is curved and in which direction, by measuring the machining gap width on the one hand and the arrow of the wire curvature on the other hand.

It requires maintaining the wire rectilinear, otherwise scratches will appear on the work piece, since the wire will turn back to its rest position at each measurement period. Here is a disadvantage of the method because it does not permit to fine finish a work piece with a curved wire without making scratches. Then it is not possible to refine the surface roughness of a voluntarily convex or concave work piece without initially making it right. Neither is it possible to control a direct cut with full high frequency machining because the arrow of the wire curvature is there manifestly higher than the gap.

Because machining is not permanent, there is no prevention that the balance of the wire during machining is broken, leading to scratches on the surface. During the measurement periods, several DC impulses follow at a low frequency, totally stopping the machining process and lasting a too long time to achieve a fine speed control by super finishing modes.

U.S. Pat. No. 6,930,273 confirms the difficulty of controlling the surface homogeneity when machining with a wire electrode at high frequency voltages. Scratches on the work piece appear if the wire is abandoned to erratic vibrations. The slightest vibration of the wire electrode affects the quality of the machined surface. Streaks may become noticeable by visual observation, if the reaction force based on the discharges and the attracting force acting between the wire and the work piece are not controlled. Said streaks are characterised by a large difference between the surface roughness in the direction parallel to the wire and the surface roughness in its perpendicular direction. It is remembered that in rough machining, when the process is badly controlled, the discharge is keen to occur successively in the same location; suggesting a corrective action in that the AC high frequency voltage may be intermittently applied between pauses and that its duration may be limited to periods shorter than 1 microsecond or to a predetermined number of alternations.

OBJECT AND SUMMARY OF THE INVENTION

In view of the above mentioned difficulties of the known prior art, it is an object of the present invention to improve the precise electrical discharge machining of a work piece.

The invention achieves this object with the subject-matters of independent claims 1 and 22, respectively. Preferred embodiments are disclosed in the dependent claims.

DETAILED DESCRIPTION

Figure 7:
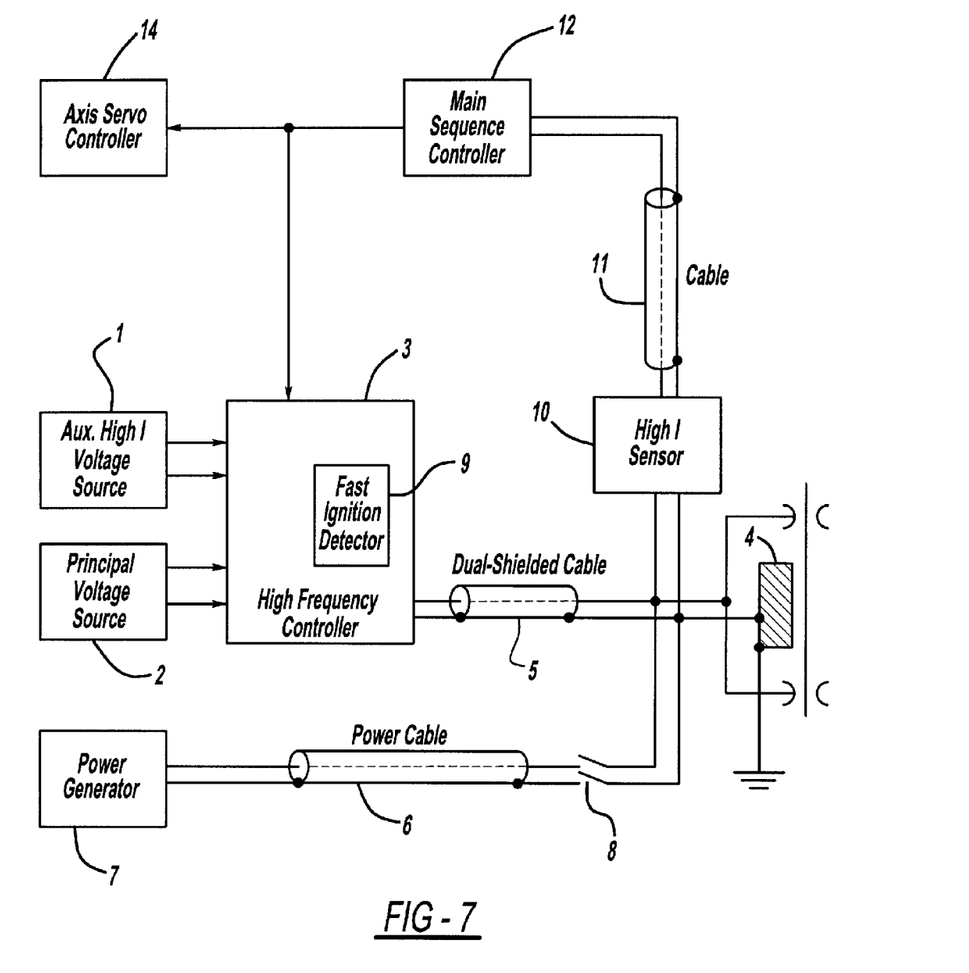
FIG. 7 is a block diagram showing the electric and logic interconnections between the main components of a system according to the invention.

Referring to FIG. 7, a system according to a preferred embodiment of the invention is described for machining a work piece by electrical discharge. Before describing further details of the components of the system, the principle of the invention is illustrated on the basis of its general functioning.

Machining pulses of two types are cyclically applied to the machining gap between the electrode and the work piece to be machined.

The first type is a measuring pulse in the form of a specific eroding pulse with a comparatively long stochastic ignition delay time preferably at a constant voltage, immediately followed by a low energy discharge produced by an extremely short machining time and a small current. The pulses of the first type may be of both polarities, i.e. positive or negative, for the purpose of generating average voltages of predetermined values, preferably zero value in order to prevent electrolysis.

The second type is an eroding pulse made up of a superposition of high frequency voltage signals controlled such as to start ignitions but working blindly during a predetermined time length and possibly synchronized with any constant voltage component; the synchronisation being either to prevent electrolysis or to yield a shining surface finish.

Each of the aforementioned two types of machining pulses may be followed by a pause, the sequence of a measuring pulse, an eroding pulse and a pause forming a complete machining cycle. At least one single pause preferably occurs after the eroding pulse. Aiming to refine even more the surface roughness, other pauses are possibly introduced after the measuring pulse to prevent that the ionised canal may induce confined repetitive ignitions during the high frequency eroding pulse. During the pauses, zero voltage is applied at the boundaries of the machining gap by means of a short circuit, so that any ionised channel disappears within the machining fluid.

The stochastic ignition delay time of each measuring pulse is measured and the gap width is adjusted such that the duration of a relatively long ignition delay time remains yet small enough for the wire electrode not to deviate, owing to its inertia, more than fractions of microns from its steady-state equilibrium, despite of a temporarily excessive electrostatic attraction force. The wire electrode seeks a steady-state position and remains in the close vicinity of equilibrium due to the interaction between the electric attraction forces, the mechanical restoring force and the plasma pressure repulsive force. It is thus taken into account that the electrode is likely to oscillate in the machining gap, wherein this oscillation process is mainly characterized by its mechanical first Eigen-period T0. It then implies corresponding limitations primarily onto the duration of the measurement pulse and secondarily onto the duration of the pauses.

The first limitation is considered by controlling within a machining cycle the duration of the ignition delay of a measuring pulse by interrupting the constant ignition voltage when the delay time exceeds a given threshold. In such a case the constant voltage pulse is followed by neither ignition nor machining discharge.

The system determines an appropriate average of the ignition delay time of a sufficient number of successive measuring pulses and uses it as an input signal to an axis servo controller which controls the electrode speed and/or electrode position on its travelling path. The axis servo controller is adapted to high frequency machining by giving means to regularly updating electrode guide speed commands in path direction, in lateral direction or in a combination of both. Updating is done preferably each millisecond, preferably corresponding to the commands updating the axis servo control, thus bringing a limitation criteria to the total duration of a machining cycle.

The system has the following principle functions: it guarantees that the intensity of the measuring pulse produces an erosive energy lower or equal to any discharge that may start due to the high frequency alternations of the eroding pulse, it limits the duration of the measuring pulse in time, it modifies the duration of the pauses and the duration of the high frequency eroding pulses as a function of the most recent samples of the ignition delay time, and it analyses the voltage profile of the current discharge which may start at the end of the measurement pulse and deduces therefrom information related to the state of the dielectric fluid filling the machining gap.

Figure 4:
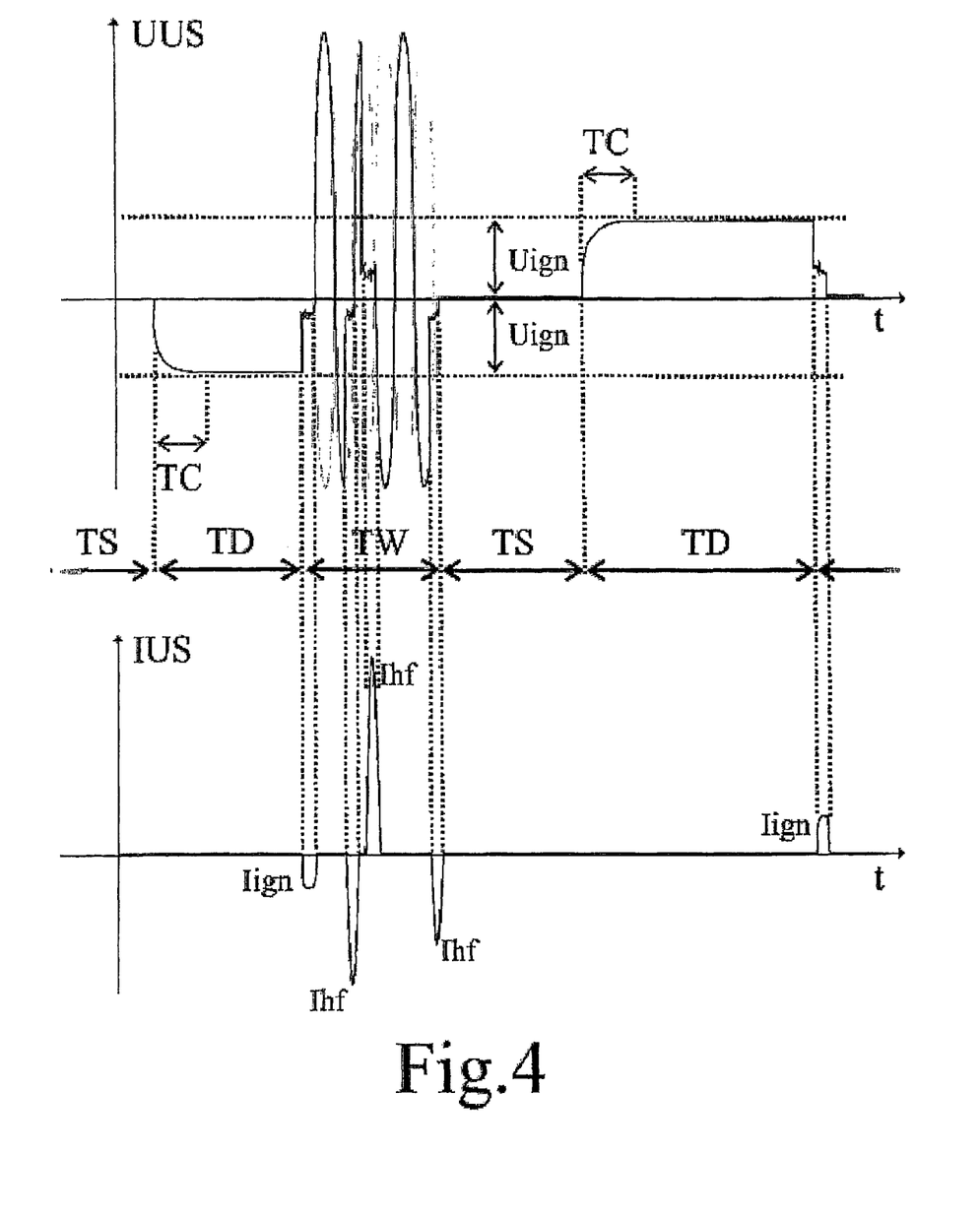
FIGS. 4-6 are time diagrams illustrating the synchronization between voltage and current discharges at the boundaries of and through the machining gap, aiming to explain three alternative modes of execution of the invention.

The sequence represented in FIG. 4 illustrates the scheduling of the signals making it possible to put into practice the functioning as described above: diagram UUS pictures the electric voltage seen at the boundaries of the machining gap; diagram IUS pictures the current which crosses the gap.

The sequence starts with the application of a continuous ignition voltage Uign of positive or negative polarity at the boundaries of the gap. The polarity of Uign is given sequence after sequence according to a known principle intended to fight electrolysis by regulating the average voltage at the boundaries of the gap. EP 1 097 773 deals with this phenomenon the disclosure of which is incorporated herein by reference. The equivalent gap capacity will be loaded during a time TC at the end of which said ignition voltage Uign appears at the boundaries of the gap. It is noted that the time TC necessary to load the gap capacity, as shown in FIG. 4, is voluntarily over proportioned to emphasize a measurement error that may be caused by excessive gap stray capacities. When not negligible the time TC should be subtracted from the ignition delay time TD to ensure a proper gap estimation.

The continuous voltage Uign applied during the time TD is intended to start an ignition before a maximum time TDmax. Let us recall that the ignition delay time TD, of stochastic nature, after the calculation of an appropriate average, permits to estimate in real time the width of the gap. According to this principle, a device measures each ignition delay time TD to calculate an appropriate average of it; the latter being used as an entry value to the control of the advance of the wire electrode on its trajectory.

At the end of the ignition delay time TD begins the machining time TW with a possible ignition caused by the Uign voltage, which opens the passage to the machining current Iign. The starting of an EDM discharge is characterized by a sudden fall of the gap voltage easily detectable and usually indexed like the end of the ignition delay time TD.

There are two principal approaches to apply the working current after ignition. The first less preferred approach uses two power sources: a first ignition source and a second machining source. Most of the time, the ignition source is used to start an erosive discharge. The machining source is then connected as quickly as possible onto the gap as soon as the ignition is detected. A too important delay must be avoided because the spark is likely to collapse and there is a risk to apply an excessive voltage at the boundaries of a gap having regained high impedance; that would inevitably tackle the wire against the work piece causing a short circuit and an interruption of machining. This is why the ignition source will be kept connected although the machining source has also been connected onto the gap. The two sources can then both output a current until they are simultaneously interrupted.

The second more preferred approach does not use the ignition source to break down the gap impedance aiming to connect the machining source. But the ignition source is principally used to carry out a measurement of the ignition delay. This will be fulfilled with a harmful side effect which must be minimized: namely the erosive discharge Iign that follows must be reduced to the minimum in order to save the refined surface roughness. In particular, a traditional ignition detector will be advantageously used which is placed at the head of a slow detection channel, as will be explained in more detail below, which orders the connection of the machining source onto the gap. The same channel will also be exploited as usual to calculate the average ignition delay, i.e. to elaborate the input signal necessary to the axis servo controller. On the other hand, a fast detection channel, as will be explained in more detail below, is provided whose only function is to quickly stop the erosive discharge Iign which follows the measurement impulse; i.e. to disconnect the ignition source. This last one can react, for instance, in less than 100 ns, as will be explained below, whereas traditional detection channels normally react in approximately 500 ns. It thus appears between the end of the measuring current pulse Iign and the beginning of the high frequency machining pulse, a short transition pause Tign_t of about 400 ns or less due to the difference of transit times between the fast detection channel and the slow detection channel. The time span of Tign_t may not be sufficient to settle zero voltage at the boundaries of the gap.

Following said short transition pause Tign_t, the machining time TW is prolonged with the application at the boundaries of the gap of a superposition of voltage signals, for instance a possible component of a continuous voltage and a high frequency voltage signal of fundamental frequency preferably higher than 500 KHz. The skilled person knows that the applied voltage signals are measurable over the gap only outside the time periods where the gap may be crossed by erosive discharges or outside the periods where it may undergo an internal short circuit or is artificially short circuited. The high frequency voltage can cause several ignitions in positive or negative polarity, because of the extremely fast variations of the electric field in the gap. The aforementioned ignitions open the passage to short current impulses of Ihf amplitude.

The possible continuous voltage component applied during the machining time TW is usually intended to more finely adjust the average voltage at the boundaries of the gap. In those cases, the source delivering said continuous voltage component would not deliver any sizeable current. But in other cases, such as to generate a shining surface finish, the said continuous voltage source may be fitted to deliver a small machining current continuing to flow through the gap after the fast variations of the electric field have initiated a plasma channel and until this channel may spontaneously or artificially collapse.

At the end of the machining time TW and until a renewed application of a continuous ignition voltage Uign and the beginning of a next ignition delay TD, a pause time TS is practiced during which zero voltage is applied at the boundaries of the gap. The end of the pause time TS is also the beginning of the next machining sequence.

To properly understand the invention the wire should be imagined well-balanced under the effect of the antagonistic forces which act together. When it is released from some of these forces, the wire balance is shifted, mainly during the ignition delay time TD and to a lesser extent during the pause time TS. During the pause time TS, the wire, if it is curved, is subjected only to the mechanical restoring force. If it is rectilinear on the other hand, this last restoring force is null and the wire is subjected to no force during the pause times. Consequently, with a wire maintained rectilinear, the duration TS of the pauses does not appear to be a critical parameter with regard to the wire balance; to a limited extent obviously since an unspecified long duration of TS would be likely to compromise the control-loop stability. Typically an amount of 10 TD samples should be collected during a control-loop period to calculate a reliable TDmoy average value. With a curved wire as mentioned previously, the mechanical restoring force acts during the pauses and shifts the balance of the wire. Difficulties may appear in two situations: when achieving direct cuts with tiny wires and when a work piece affected by shape inaccuracies (convex or concave) has to be refined on its surface without removing said inaccuracies. In both cases, it is preferred to sufficiently limit the pause time TS so that the wire curvature is maintained and the wire is not shifted moreover than a certain tolerance compared to its balance position.

During the ignition delay time TD of the measuring pulse, the movement of the wire shifted out of its balance is related to two parameters on which it is possible to act instantaneously: the duration of the ignition delay time TD, and the value of the applied ignition voltage Uign. During the ignition delay time TD, the plasma pressure repulsive force caused by the discharges disappears. The wire is then subjected to the electrostatic attraction force and, if it is curved, to the mechanical restoring force; the latter being added or withdrawn from the preceding one. The value of the ignition voltage Uign applied during the ignition delay time TD can not be excessively reduced, otherwise failing to regularly launch ignition within a predetermined time TDmaxi, thus not being able to reliably calculate an appropriate average. Consequently, in both cases, rectilinear or curved wire, a limit is imposed on the duration of the ignition delay time TD.

Figure 1:
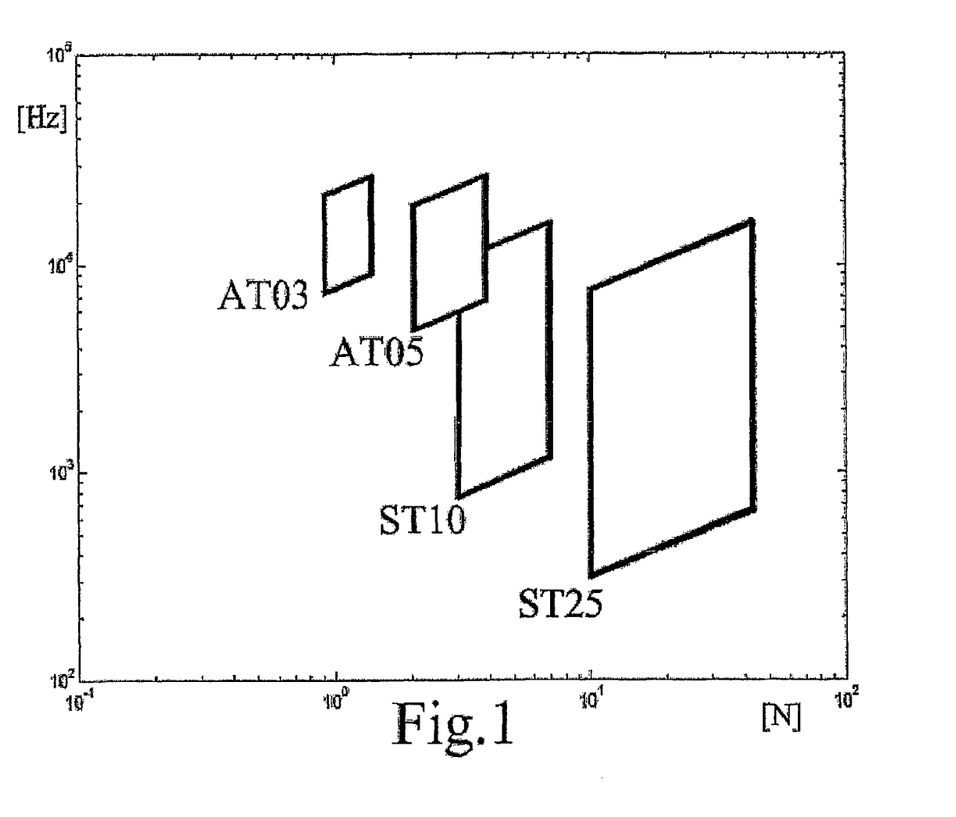
FIG. 1 is a graph illustrating the relation between the logarithms of the preload force and the Eigenfrequency of four wire electrodes inside their domain of regular use pictured by four parallelograms.

The pause times TS and/or ignition delay time TD are fixed to appropriate duration values in all possible cases as the wire equilibrium depends as a whole on several independent variables like: the mass of the wire per unit of length, the longitudinal force applied, the length of the wire between its two wire guides, the electric attraction forces, the repulsion forces caused by the erosive discharges, the viscous damping of the dielectric medium, etc. Aiming to get a simple and general rule, the first Eigenperiod of the wire oscillation is used as a reference value; an easily calculable parameter, as shown in FIG. 1. The four parallelogram shaped areas indicate the domain of regular use of four different wire types. ST25 and ST10 are zinc alloy clad wires with a brass core of respective diameter 0.25 and 0.10 mm; AT05 and AT03 are steel core wires of diameters 0.05 mm and 0.03 mm. The bottom-left point of the parallelograms indicates the lowest longitudinal preload force and highest distance between wire guides. The top right point indicates the highest preload and lowest distance between wire guides.

The following does not present the physical laws or the mathematical models which describe the balance and the dynamics of a wire electrode during machining by electroerosion, but indicates in which restricted fields to use them. To find the theory of the vibrating cords and their Eigenperiods one can easily refer, for instance, to elementary physics or more particularly to "Boundary and Eigenvalue Problems in Mathematical Physics" by Hans Sagan.

The recent evolutions of wire electroerosion are known to the skilled person and are described in particular in the following publications:
  "Funkenerosive Mikrobearbeitung von Stahl und Hartmetall durch Schneiden mit dünnen Drähten", Tobias Nöthe, RWTH Aachen, Shaker Verlag, Band May 2001.
  "Funkenerosives Feinstschneiden Verfahrenseinflüisse auf die Oberflächen-und Randzonenausbildung", Rolf Siegel, RWTH Aachen, 1994, Fortschritt-Berichte VDI.
  "Relevant topics in wire electrical discharge machining control", Friedhelm Altpeter, Roberto Perez, Charmilles Technologies SA, Journal of Material Processing Technology 149 (2004) 147-151.

On the basis of the known theories, one can calculate the displacement of a wire under the effect of the electric forces which are applied to it during one period of duration T. The diagrams of FIGS. 2a-c and FIGS. 3a-c picture the variables on the horizontal and the vertical axis in a standardized form. On the horizontal axis appears the application time of the excitation signal, i.e. a voltage intended to shift the wire laterally. The unit of measure on this horizontal axis is a time equal to the first Eigenperiod T0 of the wire. On the vertical axis appears the side displacement of the wire or arrow in a location halfway between the two wire guides. The unit of measure on this vertical axis is a displacement equal to the maximum amplitude reached in a stationary state under the effect of a given voltage permanently applied.

Figure 2A:
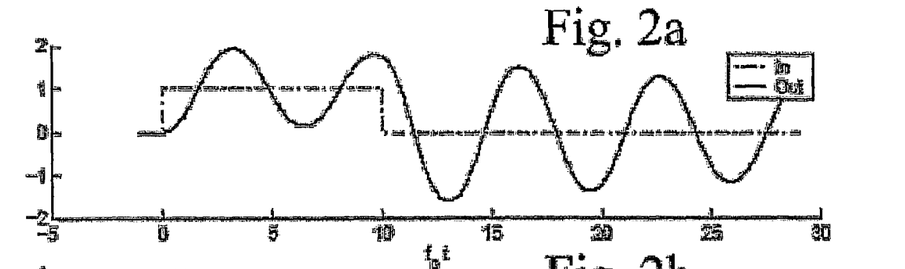
FIGS. 2a-c and 3a-c are time diagrams illustrating the lateral displacement of a wire electrode, in full line, caused by a voltage excitation signal, in dotted line.
Figure 2B:
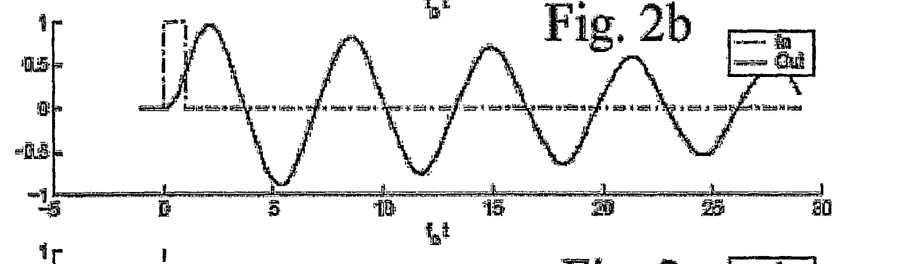
Figure 2C:
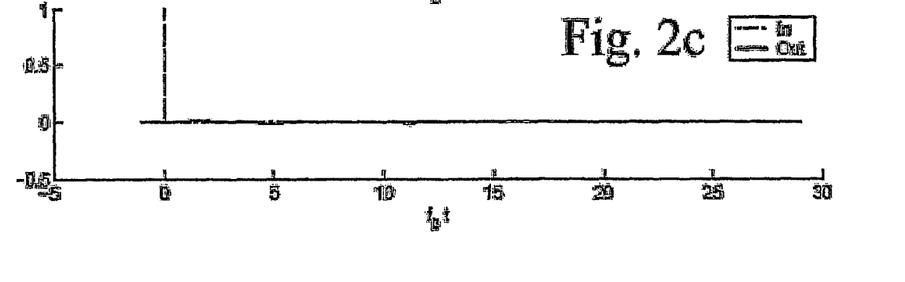
Figure 3A:
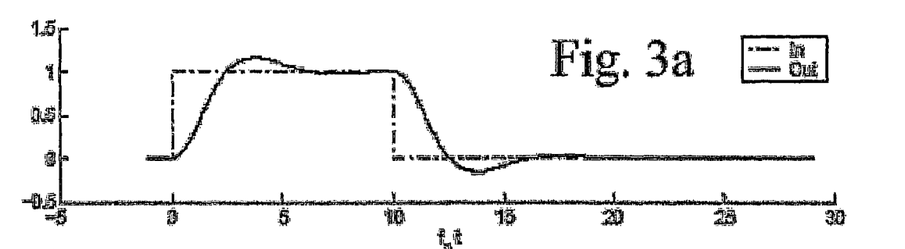
Figure 3B:
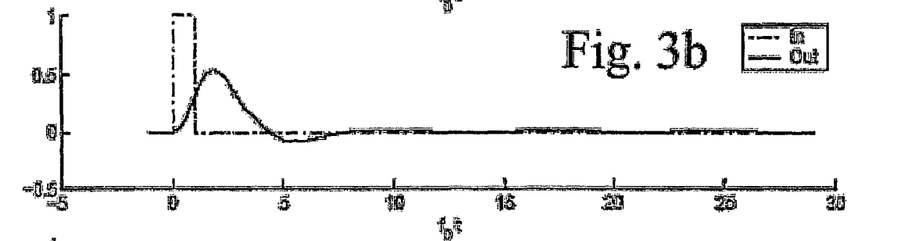
Figure 3C:
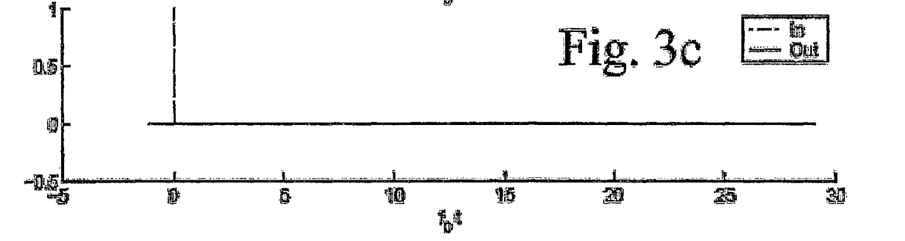

FIGS. 2a-c represent the shift displacements of a wire immersed in a not very viscous medium, for example air. FIGS. 3a-c represent the shift displacements of a wire immersed in water. The dotted line indicates the application time of the excitation signal, or input, of which three values are illustrated:
1) $T \geq 10*T0$, see FIGS. 2a and 3a, is the domain described by U.S. Pat. No. 6,320,151 mentioned above, 2) T≈T0, see FIGS. 2b and 3b, features the limit of the domain related to the present invention, 3) T≦T0/10, see FIGS. 2c and 3c, is the preferred functioning area of the present invention.

It must be noticed that for a application time T close or lower than T0/10 the wire undergoes a negligible shift; the viscosity of water still reduces this displacement. Whatever the particular values of the numerous variables concerned in this phenomenon, it is thus enough to limit the application time of the electric ignition voltage to 20% of the first Eigenperiod of the wire, preferably to a value lower than 10% of this Eigenperiod, so that the wire undergoes a negligible displacement during the ignition delay time TD.

By extension and a fortiori, the same limits applied to the pause times TS will produce similar effects, in direct cuts or in applications where one wishes to carry out a super-finish machining with a curved wire on a work piece whose geometry is not perfect as already mentioned above.

Below, a device for reducing the ignition delay time TD of the first measuring pulse and for only moderately influencing the wire balance and thus by the way the time to be measured will be described in detail. One part of this device is a control loop of the machine axis velocity complying with known rules of practice, to impose the advance of the wire guides in the direction of the programmed trajectory and/or perpendicular to it and to achieve a suitable TDmoy average value of the ignition delay. The advantage of such a device is to maintain an ignition delay time TD quite lower than the control loop period. Indeed for a 2 ms typical control loop period, for instance, it is possible to create a tough control loop able to adapt to the imperfections of the surface to be finished. Several samples of TD, up to 10 for example, can be collected during a loop period so that a TDmoy average value can be determined representative of the real gap size. In addition since TDmoy is preferably smaller or equal to T0/10, the given value of the loop period determines an operation range for commonly used wire electrodes. FIG. 1 shows in our example that the invention may be applied for direct cuts or super-finish applications by using wires having Eigenfrequencies lower than 50 KHz.

In order to overcome the stochastic character of the ignition delay, in other words although a TDmoy value can be maintained, statistically excessive long durations of TD have to be avoided (although such events are not frequent), a not controlled excursion of the wire electrode, during the finishing stages, is liable to leave a visible mark on the machined surface. Thus, a device is provided which can stop the application of the ignition voltage Uign if TD happens to be prolonged further than a certain TDmaxi that has been empirically determined. A systematic recording of the logarithms or the ignition delays of an appropriate control loop shows a distribution looking like a Gaussian function whose average value is about log(TDmoy). The probability of recording ignition delays TD greater than 10*TDmoy proved to be smaller than 0.1%. It is then preferred to limit TD to a value TDmaxi=10*TDmoy without any risk, which is equivalent with a TDmaxi value smaller than the Eigenperiod T0 of the wire, preferably smaller than T0/2. In such a case, when TD will be limited accordingly, the sequence described above is simplified, i.e. the Iign current pulse lacks and the time of machining TW begins with the application of the alternating high frequency voltage.

Figure 5:
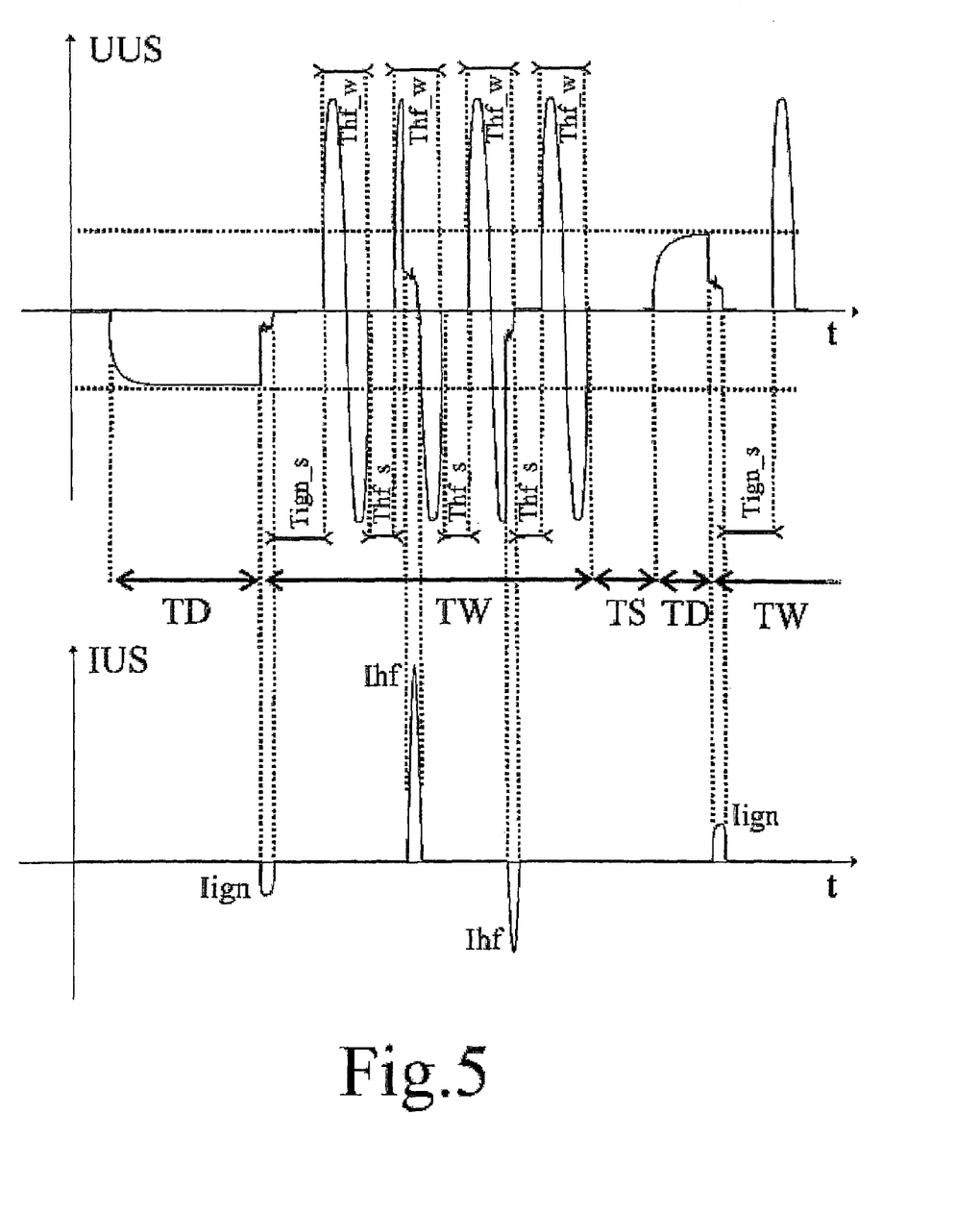

It was experienced that the sequence of signals illustrated in FIG. 4 can be further improved. Successive discharges of current during a sequence are liable to occur at the same place on the machined surface unless additional pauses are inserted during the machining time TW. This phenomenon well-known under the name of "localization" produces a degradation of the surface roughness. To avoid this phenomenon and to refine surface roughness, additional pauses during which the machining gap is short circuited, are preferably introduced during TW as shown in FIG. 5. A pause Tign_s can take place immediately after the Iign current discharge. Tign_s includes the small transition pause Tign_t of FIG. 4, allowing to reduce the duration of the pause TS or even more to replace it, thus undergoing the same time limitations. Several small pauses Thf_s can also be placed inside the high frequency alternations until the end of TW. In FIG. 5, Thf_w is pictured as the duration of a full period of the high frequency alternating voltage. Said small additional pauses Thf_s are shorter than the actual pause time TS, preferably shorter than the time equivalent of 2*Thf_w, as shown in FIG. 5.

Figure 6:
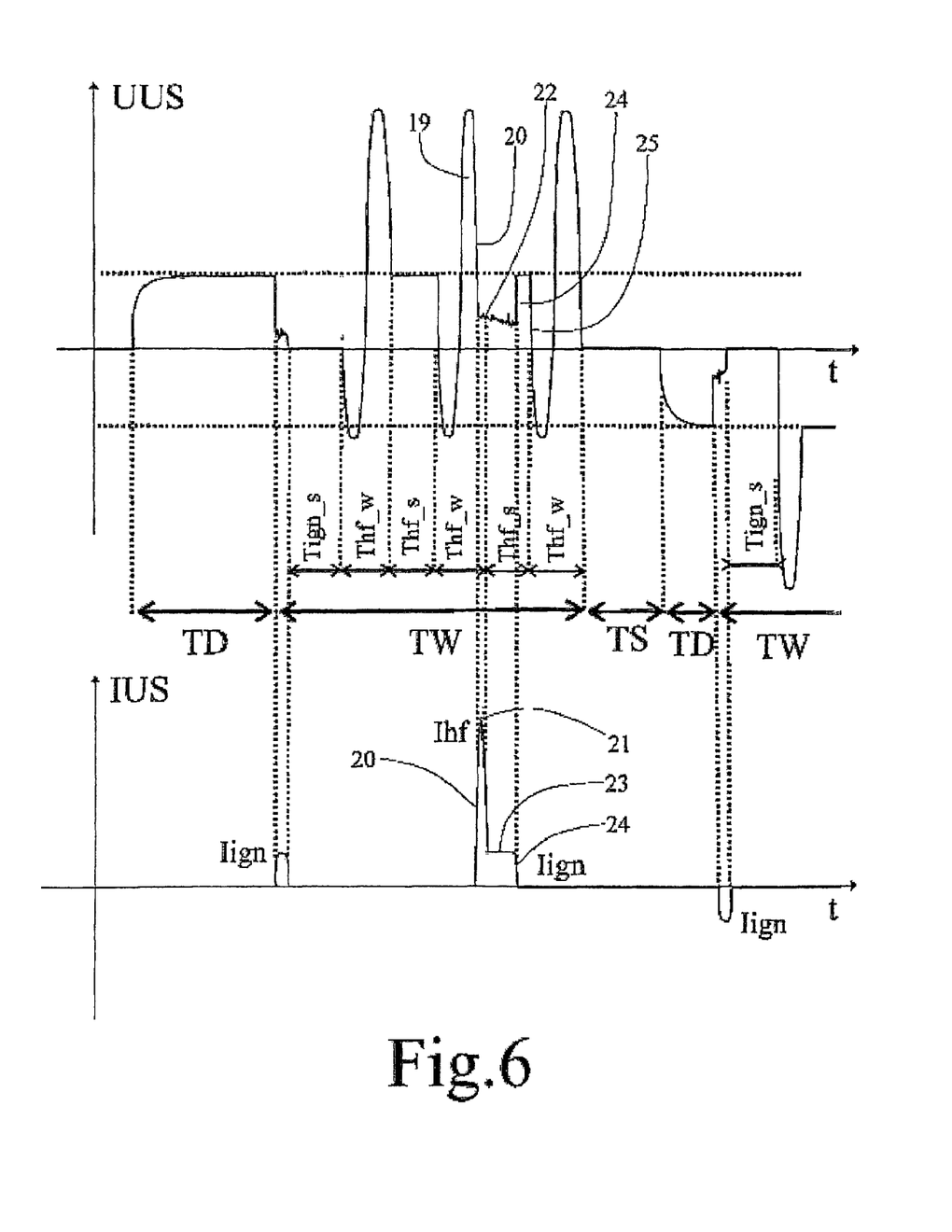

The preceding mode illustrated by FIG. 5 gives an extremely fine and accurate surface roughness but nevertheless somehow depreciated by a darkened dull appearance. To improve said appearance, adjusting a continuous source to output a small current during the machining time, as shown by FIG. 6, permits to obtain a brilliant aspect (a shining surface finish) but with a less fine surface roughness. As illustrated by FIG. 6, a shining effect can be obtained, for instance, by serially connecting the auxiliary high impedance voltage source 1 of FIG. 7 (which will be described in more detail below) to the gap during the application of the high frequency voltage signal and by including prolonged Thf_s pauses. A high frequency voltage impulse 19 initiates a plasma channel 20 which opens the passage to a strong current impulse 21 delivered by the principal source 2 of FIG. 7 (which will be described in more detail below). At the end of the Thf_w period 22 the plasma channel doesn't collapse because the auxiliary high impedance voltage source 1 of FIG. 7 takes over with a small current 23. The plasma channel may collapse prematurely, at 24, before the voltage alternation 25 causes the current to stop and the voltage to recover the Uign value.

The duration of the erosion time TW is programmable, for instance, from zero to 12 ms; a usual operation consists in making the duration of TW depending on the measured duration of the preceding ignition delay time. TD. For example, a short TW may run after a short TD and conversely. The duration of the pause time TS can also usually be programmed according to the actual values of TD or the particular characteristics of the discharge which follows or not TD. The following patents deal with such problems the disclosure of which are incorporated herein by reference: U.S. Pat. No. 5,336,864, CH 644 290, CH 554 215. The profile of the voltage signal during the application of Uign is an indicator of the pollution level inside the gap and can be used to start a series of longer pauses.

As an example, the size of an electro erosion crater is proportional to the charge (in Coulomb) delivered during the discharge. The aforementioned charge was measured in the following three high frequency machining modes (except the shining mode): the preliminary finishing mode, the finish mode and the super-finish mode.

$Q\_TD$ is the charge delivered by a measurement discharge, and $Q\_HF$ the charge delivered by an high frequency machining discharge; it was checked that in all the cases $Q\_TD \leq Q\_HF$.

For the preliminary finishing mode with minimal machining current:

$Q\_TD=0.5 \, [A] \cdot 0.6 \, [us] = 0.3 \, [Cb]$ $Q\_HF=2.0 \, [A] \cdot 0.4 \, [us] = 0.8 \, [Cb]$ For the finishing mode:

$$Q\_TD = 0.5\,[A] \cdot 0.1\,[us] = 0.05\,[Cb]$$

$$Q\_HF = 1.5\,[A] \cdot 0.18\,[us] = 0.27\,[Cb]$$

For the super-finish mode:

$$Q\_TD = 0.5\,[A] \cdot 0.1\,[us] = 0.05\,[Cb]$$

$$Q\_HF = 1.0\,[A] \cdot 0.05\,[us] = 0.050\,[Cb]$$

Referring again to FIG. 7, the main components of the system are a principal voltage source 2 acting as machining source, an auxiliary high impedance voltage source 1 acting as ignition source by producing an ignition voltage Uign and an ignition current Iign, a high frequency controller 3 and a power generator 7 dedicated to rough machining (which will not be described in more detail, below, since its design and functioning is known to the skilled person). The principal voltage source 2 and the auxiliary high impedance voltage source 1 are connected in parallel to the entry of the high frequency controller 3. The machining zone 4 is connected to the exit of said high frequency controller 3 by a twin-axial HF dual-shielded cable 5. The power cables 6 connecting the power generator 7 to the machining zone 4 may be disconnected using relays 8. Consequently they do not add their capacity to the stray capacity of the machining zone 4.

The system may be designed to machine finished surfaces using high-frequency voltages higher than 500 KHz in order to produce either a surface roughness lower than 0.1 micrometer (Ra) or a shining surface finish. For finish machining, the twin-axial HF dual-shielded cable 5 may have a low capacity of 50 pF/m typical impedance, and the current of the auxiliary high impedance voltage source 1 is limited to 0.5 A. Its voltage can be adjusted in a range from 20 to 100 Volts to guarantee that ignitions will occur in majority within a predetermined time delay TDmaxi.

The high frequency controller 3 controls the machining sequence as represented in FIG. 4, 5 or 6, i.e. to synchronize the connection of the principal 2 and auxiliary sources 1 to the machining zone 4, as will be described below. The high frequency controller 3 is driven by two logic signals coming from a main sequence controller 12 for controlling the basic time durations of the machining cycle, namely TD, TW and TS. The high frequency controller 3 includes a battery of fast transistors assembled in a bridge configuration as known by the skilled person which are no illustrated in the drawings.

The main sequence controller 12 controls, by mean of two logic signals, the high frequency controller 3 to connect the ignition voltage Uign onto the machining gap 4 and to start the application of eroding pulses TW; altogether building a slower detection channel as will be described in more detail below. The main sequence controller 12 does not stop the discharge current Iign; instead the fast ignition detector 9, illustrated in more detail in FIG. 9, will take over the duty to stop Iign. The fast ignition detector 9 is installed directly inside the high frequency controller 3 in the immediate vicinity of its transistors 17 (see below) switching the ignition current Iign and connected to its exit. Thus the transmission time of the control signal is made as short as possible so as to quickly stop the erosive discharge current Iign as soon as ignition is detected. The fast ignition detector 9 enables that the energy of the discharge Iign required for the measurement is not higher than the energy of any high frequency current discharge Ihf.

Figure 8:
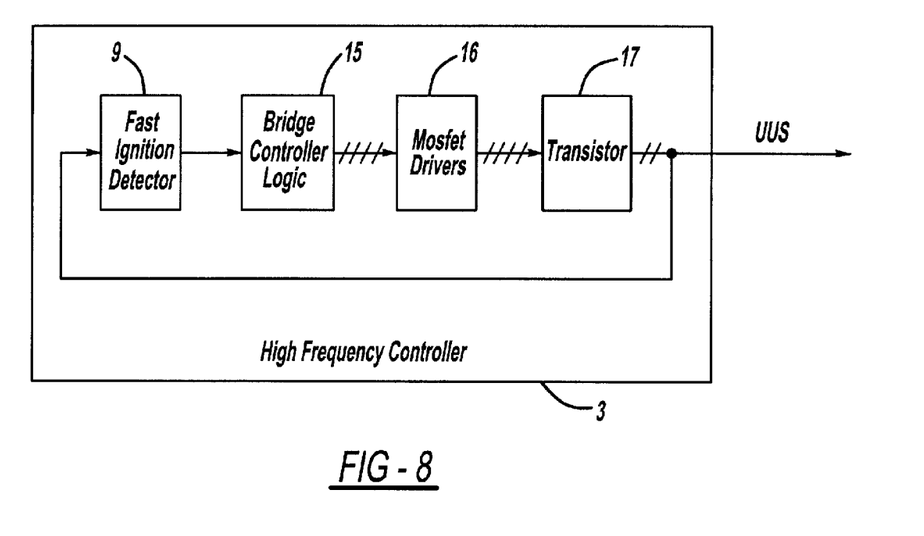
FIG. 8 shows more details of the high frequency controller of FIG. 7.

A preferred embodiment of the high frequency controller 3 is shown in FIG. 8, together with its connection to the main sequence controller 12 and the machining zone 4. When ignition occurs, the fast ignition detector 9 needs, for instance, about 50 ns to react to a signal UUS coming from the machining zone 4 and to send a command to a bridge control logic 15. After, for instance, about 30 ns the bridge control logic 15 energises 4 high speed opto-couplers closely bounded to 4 high speed MOSFET drivers 16 acting on 4 Coolmos transistors 17 coupled in a full bridge configuration. The ignition information is transmitted from the machining gap 4 through the full channel consisting in series of the components 9, 15, 16, 17 as shown in FIG. 8 in less than, for instance, 100 ns, thus stopping swiftly the ignition current Iign. This configuration illustrates the fast detection channel, as already mentioned above, allowing reaction times even shorter than 50 ns by using even faster components.

Figure 9:
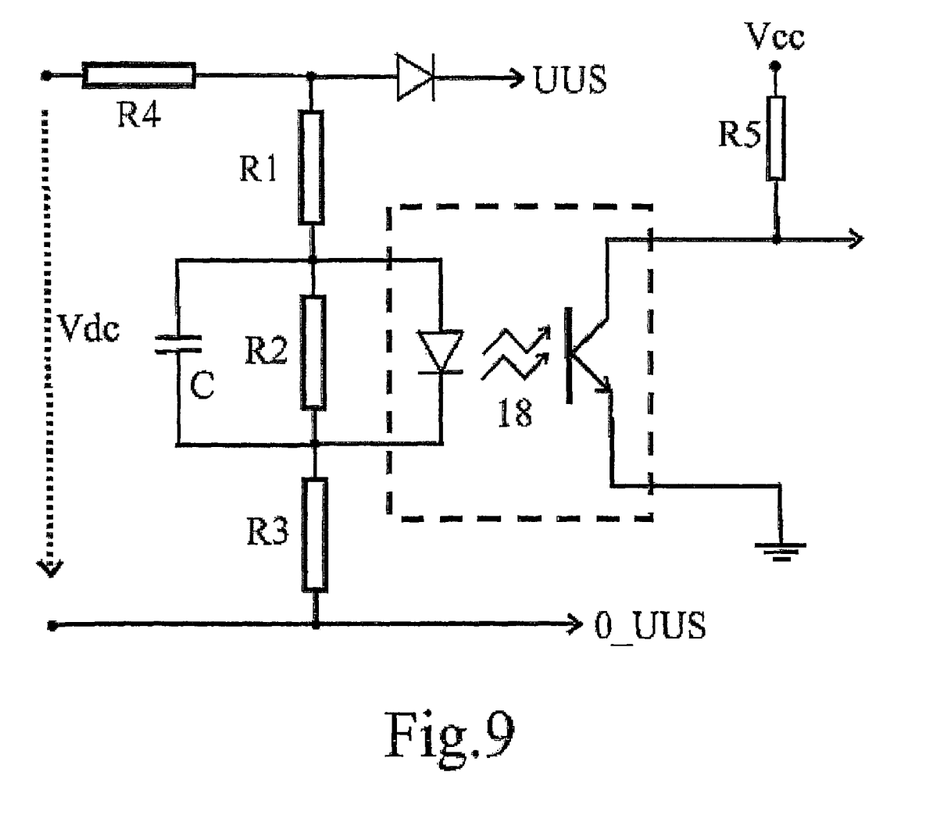
FIG. 9 shows more details of the fast ignition detector of FIGS. 7 and 8.

The fast ignition detector 9 of FIGS. 7 and 8 is shown in more detail in FIG. 9 as comprising a fast opto-coupler 18, for instance a HCPL0631 of manufacturer Agilent. Upstream of the opto-coupler 18 the two polarities of the input signal UUS energise an adjustable resistance divider R1, R2, R3 acting as a comparator with the supply voltage VDC. The opto-coupler 18 is connected with its output to the input of the bridge control logic 15, thus complementing its galvanic insulation.

The fast ignition detector 9 placed inside the high frequency controller 3 in the immediate vicinity of its transistors 17 is not dedicated to form an input signal for the axis control loop. For this purpose a specific differential probe 10 is connected to the electronic device 12. The differential probe 10 connects the machining zone 4 to the electronic device 12 that calculates in a common manner the actual average value TDmoy necessary to the speed axis control unit 14. This connection over components 10, 11 and 12 allows a return of the signal with a delay shorter than, for instance, 400 ns. The connection between the axis servo controller 14 and the remaining process is not shown in FIG. 7 since it is known to the skilled person.

Figure 10:
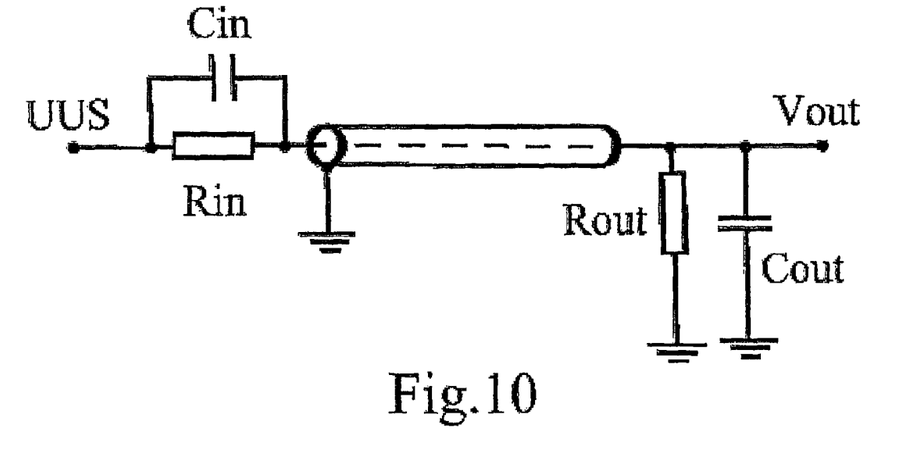
FIG. 10 shows more details of the connection between the machining gap and the ignition delay detector of FIG. 7.

The difficulty here is that the probe 10 with a common cable length 11 of, for instance, 4 m would introduce an additional stray capacity into the discharge circuit prejudicial to the necessary surface roughness. In order to overcome this difficulty the principle of the traditional oscilloscope probe is used according to FIG. 10. A RC divider made of a resistance and a capacity in parallel is introduced upstream and downstream at each end of the cable 11. Then, at the machining gap 4, the total stray capacity depends only on the down-stream RC capacity and becomes independent of the cable capacity whatever its length. FIG. 9 represents only one branch but actually 2 identical probes 10, positive and negative, are needed.

The hardware architecture described above is only an example. To obtain the desired machining signals, one could also make use of discrete high frequency sources parallel or serial connected to the machining gap 4 in association with DC sources.

Summarizing, the measurement device of the ignition delay TD limits the energy of the measurement such that the necessary energy of the measurement discharge following the ignition delay time TD should not be higher than the energy of any of the discharges caused by the application of the high frequency alternating voltage. To this end the measuring device comprises the following devices as shown in FIG. 7:

- The separate auxiliary high impedance and adjustable voltage source 1 to produce the ignition voltage Uign and the Iign current.
- The fast ignition detector 9 located in the immediate vicinity of the transistors 17 that switch off the ignition voltage Uign to stop the current Iign.

The high impedance sensor 10 to measure the ignition delay while reducing the stray capacity of the discharge circuit.

A battery of relays 8 to disconnect the cables from the roughing generator 7 in order to eliminate the main part 6 of the stray capacities present on the discharge circuit.

Of course, the invention is not limited to the above preferred embodiment. Instead of using a wire electrode, any other kind of electrode may be used, such as a rod electrode, etc. Similarly, instead of machining with high frequency pulses low frequency alternations of the eroding pulse may also be applied. The invention not only applies to finishing stages of the machining, but also to earlier stages, such as rough machining, etc.

The invention claimed is:

1. A method for electrical discharge machining of a work piece by means of a working electrode, comprising:
    applying a sequence of working pulses on a work gap between a working electrode and the work piece, wherein the working pulses comprise:
    eroding pulses for eroding material off the work piece; and
    measuring pulses during which an ignition voltage is applied on the work gap in order to initiate a discharge within the work gap and to measure the corresponding ignition delay time; and
    adjusting at least one of the ignition voltage and/or the gap width are adjusted such that the ignition delay time is smaller than an oscillation time of the working electrode oscillating within the work gap due to an electrostatic attraction force and a mechanical restoring force.

2. The method according to claim 1, wherein the gap width is adjusted during the eroding pulses on the basis of the ignition delay time measured during the measuring pulses.

3. The method according to claim 1, wherein a continuous ignition voltage of a predetermined polarity is applied to the work gap during the measuring pulses, wherein the polarity is selected for each measuring pulse such that the average voltage over the work gap tends to a predetermined constant value.

4. The method according to claim 1, wherein at least one of the gap width and the ignition voltage during the measuring pulses are adjusted such that the ignition delay time is smaller than a first predetermined maximum time value in over 50% of cases.

5. The method according to claim 4, wherein the first predetermined maximum time value is shorter than the first Eigenperiod of the working electrode.

6. The method according to claim 4, wherein an average value of the ignition delay time is determined on the basis of a plurality of ignition delay times measured during a plurality of measuring pulses and the gap width and/or the ignition voltage during the measuring pulses are controlled such that the average ignition delay time is smaller than a second predetermined maximum time value, wherein the second predetermined maximum time value is smaller than the first predetermined maximum time value.

7. The method according to claim 6, wherein the second predetermined maximum time value is at least five times shorter than the first Eigenperiod of the wire electrode.

8. The method according to claim 4, wherein during the measuring pulses the application of the ignition voltage is interrupted if the measured ignition delay time exceeds the first predetermined maximum time value.

9. The method according to claim 1, wherein the eroding pulses are followed by a pause time during which a zero eroding voltage is applied on the work gap.

10. The method according to claim 9, wherein the sequence of working pulses are constituted by a periodical time sequence composed in succession of a measuring pulse, an eroding pulse and a first pause time, wherein a second pause time is added after the ignition current which is flowing after the ignition started by the measuring pulse has been stopped, wherein a third pause time is added after each high frequency pulse or each high frequency alternation within an eroding pulse, and wherein the work gap is short circuited during at least one of the first, second and third pause time.

11. The method according to claim 1, wherein the eroding pulses include a plurality of high frequency pulses having a frequency higher than 500 KHz.

12. The method according to claim 11, wherein the ignition current flowing after the ignition started by the measuring pulse is limited to a value smaller than the discharge currents flowing within the high frequency pulses.

13. The method according to claim 11, wherein the ignition current flowing after the ignition started by the measuring pulse is limited to a duration shorter than 100 ns.

14. The method according to claim 11, wherein a third pause time is added after each high frequency pulse or each high frequency alternation within an eroding pulse.

15. The method according to claim 14, wherein the third pause time is limited to a duration shorter than the first pause time.

16. The method according to claim 14, wherein a continuous voltage is superimposed to the plurality of high frequency pulses during the third pause time, said continuous voltage coming from a voltage source adapted to deliver a current smaller than the discharge current initiated by the high frequency voltage.

17. The method according to claim 16, wherein the duration of at least one of the eroding pulse, the first and the second time duration is adjusted on the basis of the measured duration of the preceding ignition delay time.

18. The method according to claim 1, wherein the sequence of working pulses are constituted by a periodical time sequence composed in succession of a measuring pulse, an eroding pulse and a first pause time.

19. The method according to claim 1, wherein a second pause time is added after the ignition current which is flowing after the ignition started by the measuring pulse has been stopped.

20. The method according to claim 19, wherein the first and/or the second pause time is limited to a duration five times shorter than the first Eigenperiod of the wire electrode.

21. The method according to claim 1, wherein the erosive power of the discharge occurring at the end of the ignition delay time is lower or equal to any discharge occurring during the eroding pulse.

22. A device for electrical discharge machining of a work piece by means of a working electrode, comprising:
    an axis servo controller configured to control a gap width of the work gap between the working electrode and the work piece;
    a pulse generator configured to generate eroding pulses to be applied on the work gap for eroding material off the work piece and to generate measuring pulses having an ignition voltage to be applied on the work gap for initiating a discharge within the work gap; and
    a controller configured to detect the ignition delay time within a measuring pulse, to control the pulse generator such that a sequence of machining pulses is applied on the work gap comprising measuring pulses and eroding pulses, and to cooperate with the axis servo controller by controlling the gap width and/or to cooperate with the pulse generator by controlling the ignition voltage such that the ignition delay time is kept smaller than an oscillation time of the working electrode oscillating within the work gap due to the electrostatic attraction force and the mechanical restoring force.

23. The according to claim 22, wherein the controller is configured to disconnect the pulse generator from the work gap if the ignition delay time of the measuring pulse applied by the pulse generator to the work gap is longer than a first predetermined time value.

24. The according to claim 22, further comprising:
a first measuring section including the controller configured to determine the average ignition delay time and to pace the pulse generator; and
a second measuring section including a fast ignition detector configured to detect the ignition started by a measuring pulse and to stop the discharge current applied by the pulse generator within a time delay shorter than the delay for the first measuring chain to apply an eroding pulse onto the machining gap following said measuring pulse.

25. The according to claim 22, wherein the controller is further configured to sample a plurality of ignition delay time values occurring in consecutive measuring pulses and to calculate an average value of this plurality of ignition delay time values as an input to the axis servo controller aiming to maintain a predetermined nominal average value of the ignition delay time by adjusting the gap width.

26. The according to claim 22, wherein the pulse generator is configured to create high frequency eroding pulses having a frequency above 500 KHz.

27. The according to claim 22, wherein the controller comprises an array of fast transistors assembled in a bridge configuration to connect and disconnect the pulse generator to/from the work gap.

28. The according to claim 27, wherein the fast ignition detector is installed in direct vicinity of the array of fast transistors of the controller and is configured to disconnect the pulse generator from the work gap in less than 100 ns as soon as an ignition has been detected.

29. The according to claim 22, wherein the fast ignition detector comprises an opto-coupler connected with its input to the work gap and with its output to an adjustable resistance divider acting as a comparator to a reference voltage.

30. The according to claim 22, wherein the controller is connected by means of a differential probe and an oscilloscope probe to the work gap.

31. The according to claim 22, wherein the ignition voltage of the pulse generator is adjusted in a range from 20 to 100 Volts to guarantee that ignitions will occur in majority within a first predetermined time delay and that their currents are lower than 0.5 A.

* * * * *